United States Patent
Imamura et al.

(10) Patent No.: US 10,836,314 B2
(45) Date of Patent: Nov. 17, 2020

(54) DISPLAY SYSTEM, ELECTRONIC MIRROR SYSTEM, MOVING VEHICLE, AND DISPLAY METHOD

(71) Applicant: PANASONIC INTELLECTUAL PROPERTY MANAGEMENT CO., LTD., Osaka (JP)

(72) Inventors: Norihiro Imamura, Osaka (JP); Michihiro Yamagata, Osaka (JP); Keiichi Matsuzaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/361,876

(22) Filed: Mar. 22, 2019

(65) Prior Publication Data
US 2019/0299858 A1 Oct. 3, 2019

(30) Foreign Application Priority Data

Mar. 27, 2018 (JP) .................. 2018-060692
Feb. 15, 2019 (JP) .................. 2019-025866

(51) Int. Cl.
*B60R 1/00* (2006.01)
*H04N 13/383* (2018.01)
(Continued)

(52) U.S. Cl.
CPC .................. *B60R 1/00* (2013.01); *B60R 1/04* (2013.01); *B60R 1/12* (2013.01); *G02B 5/10* (2013.01);
(Continued)

(58) Field of Classification Search
CPC .... B60R 1/00; B60R 1/04; B60R 1/12; B60R 2001/1215; B60R 2001/1253;
(Continued)

(56) References Cited

U.S. PATENT DOCUMENTS

| 2016/0170487 A1* | 6/2016 | Saisho ............... G01C 21/3635 345/156 |
| 2017/0307883 A1 | 10/2017 | Yamasaki |
| 2017/0371156 A1 | 12/2017 | Heishi et al. |

FOREIGN PATENT DOCUMENTS

| JP | 2009-120080 | 6/2009 |
| JP | 2015-015708 | 1/2015 |

(Continued)

OTHER PUBLICATIONS

Sekiya et al., "2-Plane Head-up display by Single DLP-PGU", International Display Workshops 2017, 2017, pp. 1138-1141.

(Continued)

Primary Examiner — Matthew K Kwan

(74) Attorney, Agent, or Firm — Greenblum & Bernstein, P.L.C.

(57) ABSTRACT

Disclosed herein is a display system including an image producing unit and an optical system part. The image producing unit produces an image on a display screen by letting a light beam, which eventually forms a virtual image based on the image produced, emerge from the display screen. The optical system part forms a left-eye image and a right-eye image on a user's left and right eyes, respectively, and thereby projects the virtual image toward a user's left and right eyes by reflecting and/or refracting the light beam emerging from the display screen. The optical system part has an image distortion generation factor to make an image distortion of the left-eye image different from an image distortion of the right-eye image.

20 Claims, 13 Drawing Sheets

(51) Int. Cl.
*H04N 13/302* (2018.01)
*G06T 5/00* (2006.01)
*B60R 1/04* (2006.01)
*B60R 1/12* (2006.01)
*G02B 5/10* (2006.01)

(52) U.S. Cl.
CPC .......... *G06T 5/006* (2013.01); *H04N 13/302* (2018.05); *H04N 13/383* (2018.05); *B60R 2001/1215* (2013.01); *B60R 2001/1253* (2013.01); *B60R 2300/20* (2013.01); *B60R 2300/8066* (2013.01); *G06T 2207/10021* (2013.01); *G06T 2207/30252* (2013.01); *H04N 2213/006* (2013.01)

(58) Field of Classification Search
CPC ........ B60R 2300/20; B60R 2300/8066; H04N 13/383; H04N 13/302; H04N 2213/006; G02B 5/10; G06T 5/006; G06T 2207/10021; G06T 2207/30252

USPC ........................................................ 348/148
See application file for complete search history.

(56) References Cited

FOREIGN PATENT DOCUMENTS

| JP | 2017-092766 | 5/2017 |
| WO | 2016/042838 | 3/2016 |
| WO | 2016/140192 | 9/2016 |

OTHER PUBLICATIONS

English translation of Japanese Office Action dated Dec. 3, 2019 and issued in Japanese Patent Application No. 2019-025866.

* cited by examiner

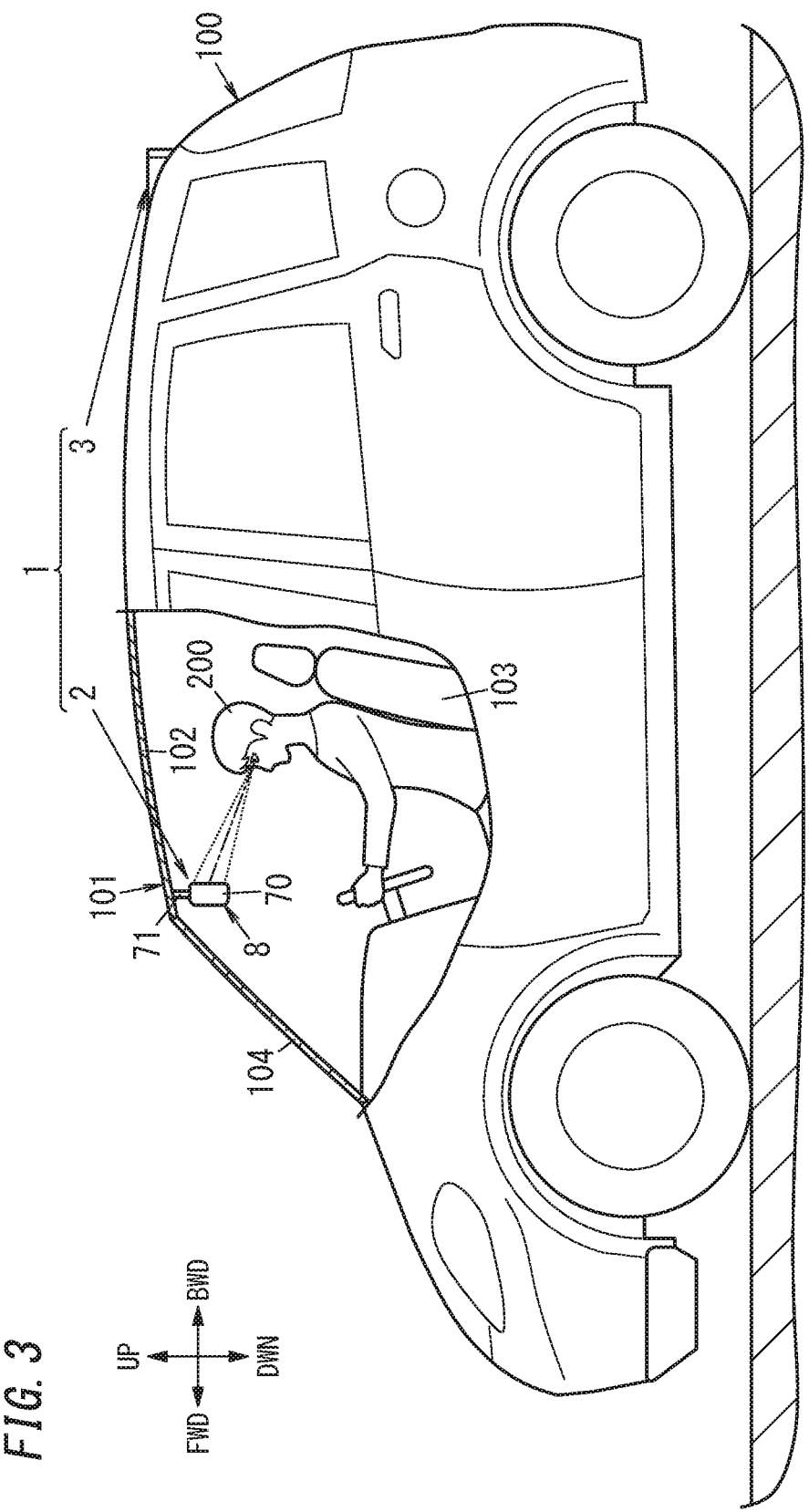

FIG. 12

| Center of Face | Image 20A | Left-Eye Image 10L | Right-Eye Image 10R |
|---|---|---|---|
| P2 | | | |
| P3 | | | |
| P4 | | | |

FIG. 13

| Center of Face | Image 20A | Left-Eye Image 10L | Right-Eye Image 10R |
|---|---|---|---|
| P2 | | | |
| P3 | | | |
| P4 | | | |

DISPLAY SYSTEM, ELECTRONIC MIRROR SYSTEM, MOVING VEHICLE, AND DISPLAY METHOD

CROSS-REFERENCE TO RELATED APPLICATION

This application claims the benefit of foreign priority to Japanese Patent Application No. 2018-60692 filed on Mar. 27, 2018, which is assigned to the assignee of the present application.

TECHNICAL FIELD

The present disclosure generally relates to a display system, an electronic mirror system, a moving vehicle, and a display method, and more particularly relates to a display system, an electronic mirror system, a moving vehicle, and a display method, all of which are configured or designed to project a virtual image based on video shot.

BACKGROUND ART

A display system for vehicles such as an electronic rearview mirror has been known in the art as a system designed to present, based on the video shot by a camera, a rear view of a vehicle traveling. Such a display system is disclosed, for example, in Japanese Unexamined Patent Application Publication No. 2009-120080 (hereinafter referred to as D1).

The display system of D1 includes a display device for producing video thereon, a reflector for reflecting the video produced on the display device, and a concave mirror for further reflecting the video that has once been reflected by the reflector. The display device produces the video shot by a camera to offer a rear view of the vehicle. The video produced on the display device is reflected by the reflector, and then further reflected by the concave mirror. This allows the display device, the reflector, and the concave mirror to form an optical path for transforming the light, emerging from the display device producing the video thereon, into an approximately parallel light beam, which is eventually allowed to be incident on the eyes of the driver of the vehicle.

SUMMARY

The present disclosure provides a display system, an electronic mirror system, a moving vehicle, and a display method, all of which are configured or designed to present a virtual image that allows the viewer to gain a sense of distance easily.

A display system according to an aspect of the present disclosure includes an image producing unit and an optical system part. The image producing unit produces an image on a display screen by letting a light beam, which eventually forms a virtual image based on the image produced, emerge from the display screen. The optical system part forms a left-eye image and a right-eye image on a user's left and right eyes, respectively, and thereby projects the virtual image toward a user's left and right eyes by reflecting and/or refracting the light beam emerging from the display screen. The optical system part has an image distortion generation factor to make an image distortion of the left-eye image different from an image distortion of the right-eye image.

An electronic mirror system according to another aspect of the present disclosure includes the display system described above and a camera. The image producing unit produces the image, based on video shot by a camera, on the display screen.

A moving vehicle according to still another aspect of the present disclosure includes the electronic mirror system described above, and a body to mount the electronic mirror system thereon.

A display method according to still another aspect of the present disclosure includes producing an image on a display screen of an image producing unit by letting a light beam, which eventually forms a virtual image based on the image produced, emerge from the display screen; reflecting and/or refracting the light beam by an optical system part to form a left-eye image and a right-eye image on the user's left and right eyes, respectively, and thereby project the virtual image toward the user's left and right eyes; and generating, by an image distortion generation factor of the optical system part, mutually different image distortions on the left-eye image and the right-eye image.

BRIEF DESCRIPTION OF DRAWINGS

FIG. 3 is a schematic representation depicting a moving vehicle including the display system;

FIG. 12 illustrates a situation where no corrections are made according to the viewpoint locations in the display system according to the third variation; and FIG. 13 illustrates a situation where corrections are made according to the viewpoint locations in the display system according to the third variation.

DESCRIPTION OF EMBODIMENTS

Embodiments (1) Overview

Figure 4:
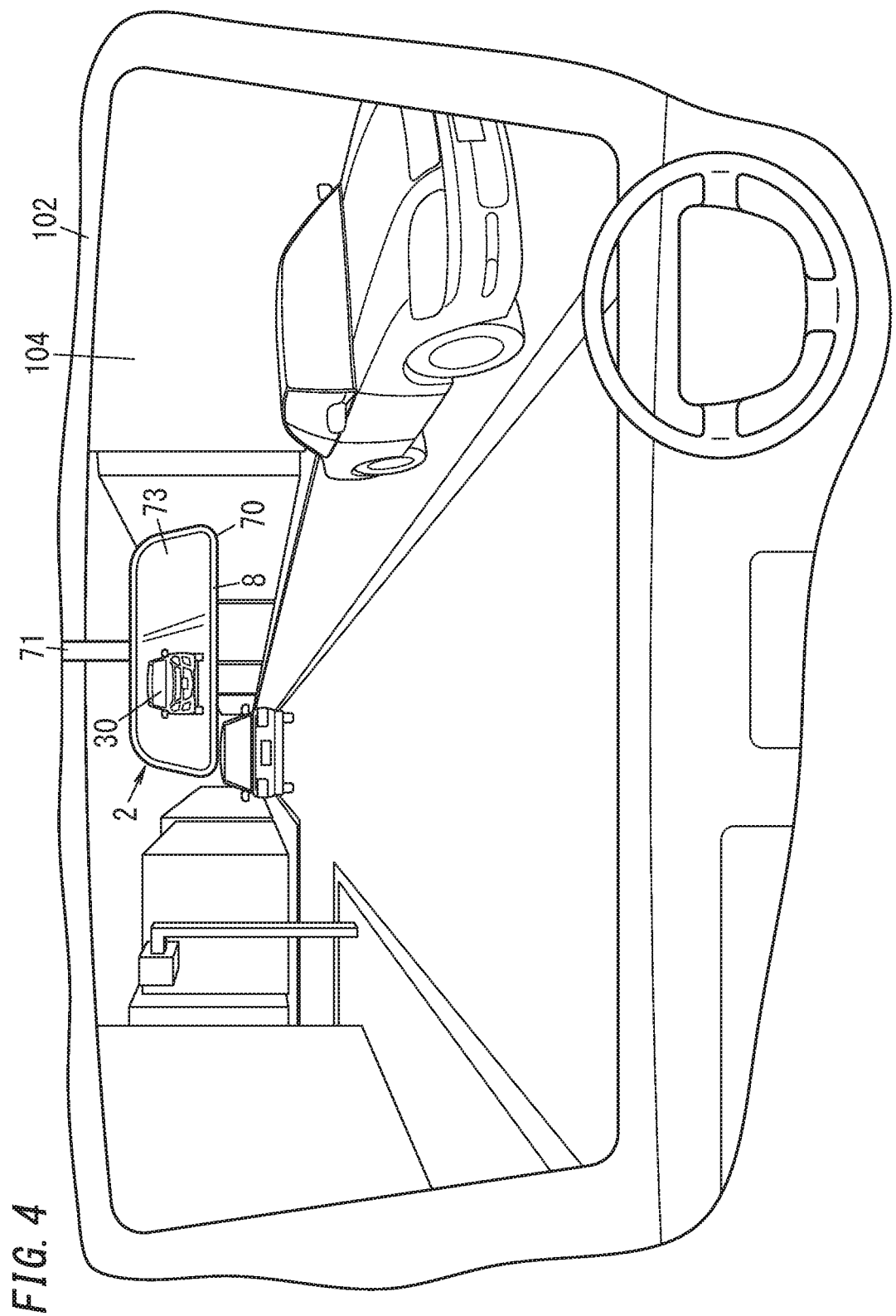
FIG. 4 depicts a front view for a user seated in the driver's seat of a moving vehicle including the display system.

A display system 2 according to an exemplary embodiment is applicable to, for example. a moving vehicle such as an automobile 100 (see FIGS. 3 and 4). Specifically, a display system 2 according to this exemplary embodiment is used in an electronic mirror system 1 configured to present a rear view of the automobile 100 based on the video shot by a camera 3.

Figure 1:
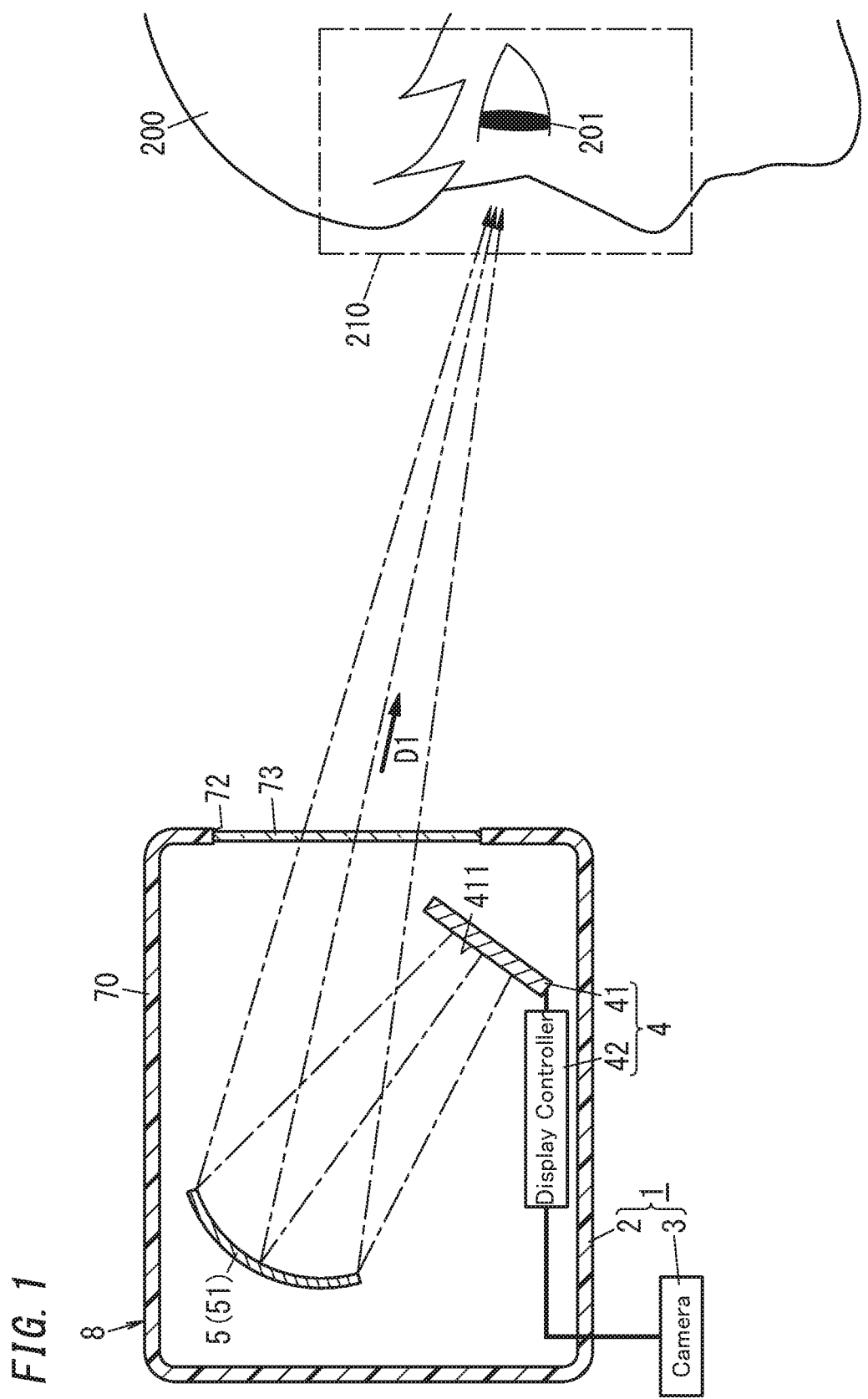
FIG. 1 illustrates a schematic configuration of an electronic mirror system including a display system according to an exemplary embodiment of the present disclosure.

The display system 2 of this embodiment includes an image producing unit 4 and an optical system part 5 as shown in FIG. 1.

The image producing unit 4 produces an image on a display screen 411 by letting a light beam, which eventually forms a virtual image 30 based on the image produced, emerge from the display screen 411.

The optical system part 5 projects the virtual image 30 (see FIG. 3) toward a user's left and right eyes by reflecting and/or refracting the light beam emerging from the display screen 411.

The optical system part 5 has an image distortion generation factor to make an image distortion (caused by aberration) of a left-eye image 10L (see FIG. 2A) formed on the user's 200 left eye via the optical system part 5 different from an image distortion (caused by aberration) of a right-eye image 10R (see FIG. 2B) formed on the user's 200 right eye via the optical system part 5.

Figure 2A:
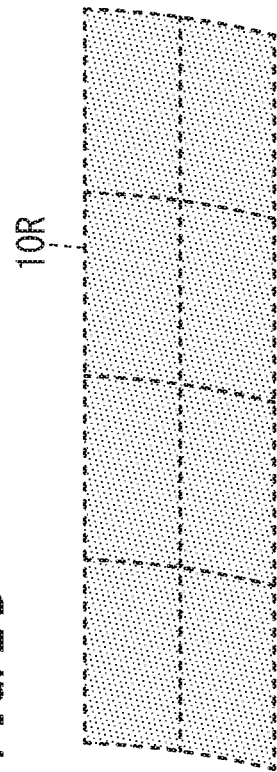
FIG. 2A schematically illustrates a left-eye image formed by the display system on a user's left eye.
Figure 2B:
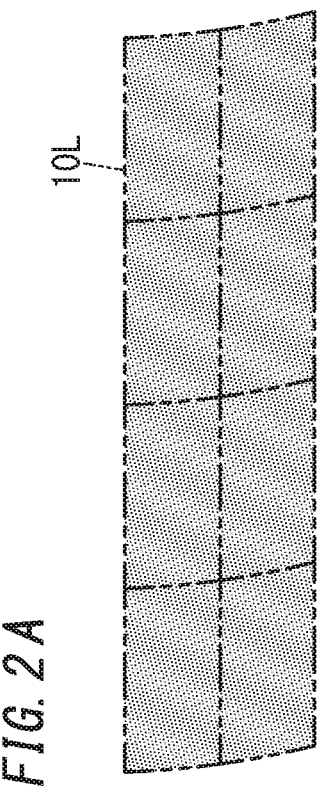
FIG. 2B schematically illustrates a right-eye image formed by the display system on a user's right eye.
Figure 2C:
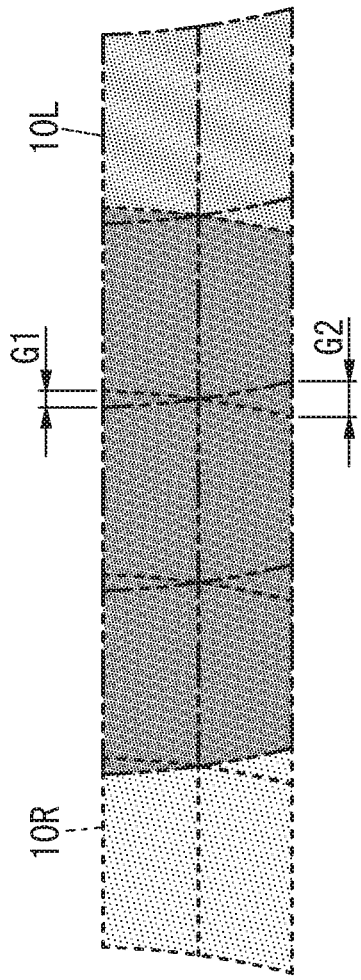
FIG. 2C schematically illustrates the magnitude of shift between the left-eye image and the right-eye image.

As used herein, the "image distortion generation factor" of the optical system part 5 refers to parameters of a reflective surface (including at least one of the shape of the reflective surface and the angle of reflection) that affect the image distortions when the optical system part 5 includes a reflective member, for example. Also, if the optical system part 5 includes a lens, then the image distortion generation factor of the optical system part 5 refers to properties of the lens (such as the surface shape of the lens) that affect the image distortion. The optical system part 5 having such an image distortion generation factor makes respective image distortions (caused by aberration) of the left-eye image 10L and right-eye image 10R formed on the left eye and the right eye, respectively, via the optical system part 5 different from each other (see FIGS. 2A-2C). Note that although the left-eye image 10L and the right-eye image 10R shown in FIGS. 2A-2C are blank images, those images are actually the video shot by the camera 3. It should also be noted that the frame lines shown in FIGS. 2A-2C to represent image distortions are imaginary ones that are actually not displayed.

The electronic mirror system 1 according to this embodiment includes the display system 2 described above and the camera 3. The image producing unit 4 produces an image, based on the video shot by the camera 3, on the display screen 411.

In this display system 2, the optical system part 5 reflects and/or refracts the light beam emerging from the display screen 411 of the image producing unit 4, thus forming a left-eye image 10L on the user's left eye and a right-eye image 10R on his or her right eye. Thus, to the user's 200 eyes, a virtual image 30 (see FIGS. 4 and 5) appears to be projected toward a point located at a predetermined distance from the eye box 210 in the direction parallel to a direction D1 in which the light beam is incident on his or her eyes via the optical system part 5 (see FIG. 1). As used herein, the "virtual image" refers to an image that appears to be present along the extension of a line parallel to the direction D1 in which the light beam is incident on the user's 200 eyes via the optical system part 5.

In the display system for vehicles disclosed in D1 cited above, a virtual image based on the video produced on the display device is presented with the display device, the reflector, and the concave mirror. In that case, it is difficult for the viewer to gain a sense of distance to an object (such as a car) present behind the car.

In the display system 2 and electronic mirror system 1 according to this embodiment, the image distortions of the left-eye image 10L and right-eye image 10R formed on the left eye and right eye, respectively, via the optical system part 5 are different from each other. This allows the left-eye image 10L and right-eye image 10R to produce a parallax between the left and right eyes, thus realizing a pseudo-stereoscopic view with the left-eye image 10L and the right-eye image 10R. This facilitates the user 200 of the display system 2 (such as the driver of the automobile 100) gaining a sense of distance to the virtual image 30, thus providing a display system 2 with the ability to present a virtual image 30 that allow the user to gain a sense of distance easily. As used herein, the eye box 210 refers to a range where the user 200 is able to view, in its entirety, the image (virtual image) presented by the display system 2 in a vehicle cabin. In other words, as long as the user's 200 eye locations fall within the range of the eye box 210, the user 200 is able to view the entire image presented by the display system 200.

(2) Details

A display system 2 according to this embodiment and an electronic mirror system 1 including the display system 2 will be described with reference to FIGS. 1-7.

The display system 2 of this embodiment is implemented as a display device 8 including the image producing unit 4 and the optical system part 5, both of which are housed in a housing 70.

The display system 2 of this embodiment is applicable to an automobile 100 as shown in FIG. 3. The display system 2 of this embodiment is provided for the body (moving vehicle body) 101 of the automobile 100 to display the video, shot by the camera 3 to present a view (such as a rear view) of the outside of the body 101, on a display device 8 (see FIGS. 3 and 4) arranged inside of the body 101 (i.e., inside of the vehicle cabin). In the following description. the upward, downward, forward, and backward directions are herein defined just as indicated by the "up," "down," "front," and "back" arrows in FIG. 3 and the rightward/leftward direction (hereinafter also referred to as a "horizontal direction") is defined as a direction perpendicular to the upward/downward direction (hereinafter also referred to as a "vertical direction") and the forward/backward direction. However, these directions are only an example and should not be construed as limiting the directions in which the display system 2 is installed. It should also be noted that the arrows indicating the respective directions on the drawings are shown there only for the purpose of description and insubstantial ones.

(2.1) Configuration

The configuration of the display system 2 according to this embodiment will be described with reference to FIGS. 1-4.

The display system 2 includes the image producing unit 4 and the optical system part 5 as described above. The display system 2 further includes a housing 70 that houses the image producing unit 4, the optical system part 5, and other members (see FIGS. 3 and 4). The housing 70 may be a molded product of a synthetic resin, for example. The housing 70 has an opening 72 on the back surface thereof. The opening 72 of the housing 70 is closed with a transparent light-transmitting plate 73 made of a transparent material (e.g., a synthetic resin such as a polycarbonate resin or an acrylic resin or glass). Note that this shape of the housing 70 is only an example and may be changed as appropriate.

The housing 70 is installed on a front portion, located close to a windshield 104, of the roof 102 of the moving vehicle body 101 so as to come into sight of the user 200 seated on the driver's seat 103 and facing front. The housing 70 is mounted via a supporting bar 71 with a ball joint onto the roof 102 of the body 101 so as not to obstruct the user's 200 front sight.

The image producing unit 4 includes a display 41 and a display controller 42.

The display 41 is implemented, for example, as a liquid crystal display (LCD) including a liquid crystal panel and a backlight in combination. The display 41 lets a light beam, which will eventually form a virtual image (such as a color image), emerge from the display screen 411, which is a monitor screen of the liquid crystal panel. The display 41 is arranged inside the housing 70 and below the light-transmitting plate 73 with its display screen 411 facing front. The display 41 does not have to be an LCD but may also be a self-emitting display panel such as an organic electroluminescent (OEL) display. Alternatively, the display 41 may also be configured to render an image on a diffuse-transmission screen by scanning the screen with a laser beam radiated from behind the screen. Still alternatively, the display 41 may also be configured to project an image onto a diffuse-transmission screen from a projector arranged behind the screen.

The display controller 42 controls the display operation by the display 41. The display controller 42 may have the capability of communicating with the camera 3 over an intra-vehicle network provided for the moving vehicle 100. The camera 3 shoots video at regular or irregular intervals to present a rear view of the body 101. The display controller 42 has the video shot by the camera 3 produced on the display screen 411 of the display 41 based on the image data acquired from the camera 3 over the intra-vehicle network. That is to say, the image producing unit 4 produces an image, based on the video shot by the camera 3, on the display screen 411. Note that the display controller 42 may communicate with the camera 3 either wirelessly or via a cable.

In this embodiment, the camera 3 includes an image capture device such as a complementary metal oxide semiconductor (CMOS) image sensor or a charge coupled device (CCD) image sensor. The camera 3 shoots video presenting a rear view of the body 101 and outputs image data in a regular cycle (e.g., at a frame rate of several ten frames per second). The camera 3 does not have to shoot video presenting a rear view of the body 101 but may also shoot video presenting a side view or front view of the body 101. Furthermore, the camera 3 does not have to shoot video presenting a rear view of the body 101 in a regular cycle but may also shoot video presenting a rear view of the body 101 at irregular intervals in accordance with an instruction from an electronic control unit (ECU) of the automobile 100 or the display controller 42, for example.

The optical system part 5 reflects and/or refracts the light beam emerging from the display screen 411 to make the light beam incident on the eyes of the user 200 of this display system 200 (such as the driver of the automobile 100). The optical system part 5 includes a reflective member 51 such as a concave mirror. The reflective member 51 is arranged inside the housing 70 such that the reflective surface of the reflective member 51 faces the display screen 411 of the display 41 and the light-transmitting plate 73. The reflective member 51 reflects the light beam that has emerged from the display screen 411 of the display 41 toward the light-transmitting plate 73. The light beam reflected from the reflective member 51 is transmitted through the light-transmitting plate 73 to enter the eyes of the user 200. This presents the image produced on the display screen 411 of the display 41 to the user 200 via the optical system part 5.

In this embodiment, the reflective member 51 has a reflective surface as a free-form surface. As used herein, the free-form surface is a curved surface represented by setting a plurality of intersections and a plurality of curvatures in a space and by making interpolations between the intersections by a high-degree polynomial. According to this embodiment, the optical path of the optical system part 5 is designed to make the image distortions of the left-eye image 10L and right-eye image 10R formed on the user's 200 left eye and right eye, respectively, via the optical system part 5 different from each other. That is to say, the free-form surface of the reflective surface of the reflective member 51 is designed to make the image distortions of the left-eye image 10L and right-eye image 10R formed on the user's 200 left eye and right eye, respectively, via the optical system part 5 different from each other. In this case, the image distortion generation factor described above is constituted by the shape of the reflective surface of the reflective member 51 or the angle of reflection, for example.

Meanwhile, the electronic mirror system 1 of this embodiment includes the display system 2 and the camera 3.

In the electronic mirror system 1, the image producing unit 4 produces the video shot by the camera 3 on the display screen 411. Thus, the electronic mirror system 1 is able to project a virtual image based on the video shot by the camera 3 and produced on the display screen 411. This allows the user 200 of the electronic mirror system 1 to view the virtual image, and monitor the rear view of the body 101, based on the video shot by the camera 3.

The electronic mirror system 1 of this embodiment is applicable to a moving vehicle such as the automobile 100. The moving vehicle includes the electronic mirror system 1 and the body 101 (moving vehicle body) that mounts the electronic mirror system 1 thereon.

(2.2) Operation

Next, it will be described how the display system 2 and electronic mirror system 1 according to this embodiment operate.

The electronic mirror system 1 starts, on receiving a display instruction from the ECU of the automobile 100, for example, performing the operation of displaying the video shot by the camera 3.

The display controller 42 acquires the image data from the camera 3 over the intra-vehicle network, and has an image, based on the video shot by the camera 3, produced on the display screen 411 of the display 41 in accordance with the image data acquired. In this case, the image produced on the display 41 has a laterally elongated rectangular shape.

When the image is produced on the display screen 411 of the display 41, the light beam emerging from the display screen 411 is reflected by the optical system part 5, thus making the light beam reflected from the optical system part 5 enter the eyes of the user 200 through the light-transmitting plate 73. As a result, a left-eye image 10L (see FIG. 2A) is formed on the left eye of the user 200 by the light beam that has been incident there via the optical system part 5 and a right-eye image 10R (see FIG. 2B) is formed on the right eye of the user 200 by the light beam that has been incident there via the optical system part 5.

In this case, the optical path of the optical system part 5 is designed (i.e., the free-form surface that is the reflective surface of the reflective member 51 is designed) to make the respective image distortions of the left-eye image 10L and right-eye image 10R different from each other. That is to say, the optical system part 5 has an image distortion generation factor (such as the shape of the reflective surface of the reflective member 51 or the angle of reflection) that makes respective image distortions of the left-eye image 10L and right-eye image 10R different from each other.

In the example illustrated in FIG. 2A, an image distortion has been generated in the left-eye image 10L to deform left-eye image 10L into a parallelogram shape such that the image is distorted to the left toward the top of the image. In the example illustrated in FIG. 2B, an image distortion has been generated in the right-eye image 10R to deform right-eye image 10R into a parallelogram shape such that the image is distorted to the right toward the top of the image. As can be seen, the image distortion generation factor of the optical system part 5 is defined such that the left-eye image 10L and the right-eye image 10R are distorted vertically asymmetrically to each other and that the left-eye image 10L and the right-eye image 10R are horizontally symmetric to each other. In this case, the left-eye image 10L and the right-eye image 10R both have the shape of a parallelogram, of which the upper side is distorted to the opposite direction from the lower side thereof. Also, "the left-eye image 10L and right-eye image 10R are horizontally symmetric to each other" means that the left-eye image 10L and the right-eye image 10R are distorted into, for example, parallelogram shapes that are horizontally symmetric to each other. As used herein, the "horizontal" direction in the left-eye image 10L and the right-eye image 10R refers to the direction in which the user's 200 left and right eyes are arranged side by side (hereinafter referred to as a "first direction") and the "vertical" direction in the left-eye image 10L and the right-eye image 10R refers to the direction (hereinafter referred to as a "second direction") perpendicular to the direction (first direction) in which the user's 200 left and right eyes are arranged side by side. Note that the vertical and horizontal directions in the left-eye image 10L and right-eye image 10R are defined within the user's 200 eye box and are not always aligned with the vertical and horizontal directions in a real space. That is to say, if the automobile 100 (moving vehicle) equipped with the display system 2 is tilted upward or downward (e.g., while traveling up or down a slope), the vertical direction in the left-eye image 10L and right-eye image 10R may be different from the vertical direction in the real space surrounding the automobile 100. Likewise, if the automobile 100 (moving vehicle) equipped with the display system 2 is tilted rightward or leftward (e.g., while traveling along a curve), the horizontal direction in the left-eye image 10L and right-eye image 10R may be different from the horizontal direction in the real space surrounding the automobile 100.

FIG. 2C illustrates a state where the left-eye image 10L and the right-eye image 10R are superposed one on top of the other in accordance with the perspective of the user 200. As shown in FIG. 2C, the left-eye image 10L and the right-eye image 10R partially overlap with each other. Specifically, FIG. 2C illustrates a perspective in a situation where the user's 200 viewpoint is located at the center of the area of overlap between the left-eye image 10L and the right-eye image 10R. In this case, the left-eye image 10L is distorted to the left toward the top and the right-eye image 10R is distorted to the right toward the top. Thus, at the upper and lower edges of the left-eye image 10L and right-eye image 10R, there is a shift between the left-eye image 10L and the right-eye image 10R. That is to say, according to this embodiment, the magnitude of the horizontal shift between the left-eye image 10L and the right-eye image 10R varies vertically in the left-eye image 10L and the right-eye image 10R. In other words, the magnitude of shift in the horizontal direction (in the first direction) between the left-eye image 10L and the right-eye image 10R measured at one point in the vertical direction (in the second direction) is different from that of their shift in the first direction measured at another point in the second direction. As can be seen, the longer the vertical distance from the user's 200 viewpoint is, the greater the magnitude of horizontal shift between the left-eye image 10L and the right-eye image 10R becomes. This allows a parallax to be produced between the right and left eyes, thus realizing a pseudo-stereoscopic view.

Furthermore, according to this embodiment, the image distortion generation factor of the optical system part 5 is defined such that a magnitude of shift G2 is greater than a magnitude of shift G1. As used herein, the magnitude of shift G1 refers to the magnitude of shift between the left-eye image 10L and the right-eye image 10R at respective upper edges thereof. The magnitude of shift G2 refers herein to the magnitude of shift between the left-eye image 10L and the right-eye image 10R at respective lower edges thereof. In the electronic mirror system 1, an object captured in an upper portion of the image is located more distant from the body 101 than an object captured in a lower portion of the image. Thus, the parallax produced by the image distortions of the left-eye image 10L and right-eye image 10R between the left and right eyes is smaller at the upper edge of the image (i.e., an image portion representing a region distant from the body 101) than at the lower edge of the image (i.e., an image portion representing a region in the vicinity of the body 101). Therefore, the parallax between the left and right eyes increases in the region in the vicinity of the body 101, thus realizing a pseudo-stereoscopic view and allowing the viewer to gain a sense of distance to the virtual image 30 more easily. In the region distant from the body 101 on the other hand, the parallax produced between the left and right eyes becomes too small to achieve the effect of stereoscopic viewing. Nevertheless, there is little inconvenience even if the viewer is unable to gain a sense of distance for an object located at a distance. This provides the user 200 with a more natural pseudo-stereoscopic view.

Figure 5B:
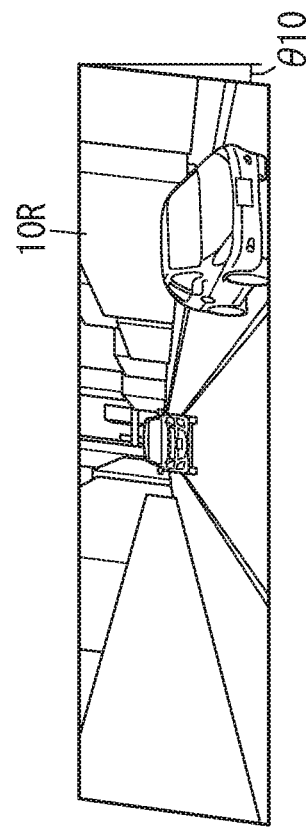
FIG. 5B depicts a right-eye image formed by the display system on the user's right eye.
Figure 5A:
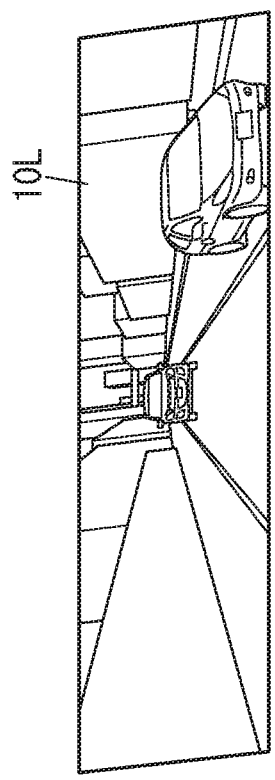
FIG. 5A depicts a left-eye image formed by the display system on the user's left eye.
Figure 5C:
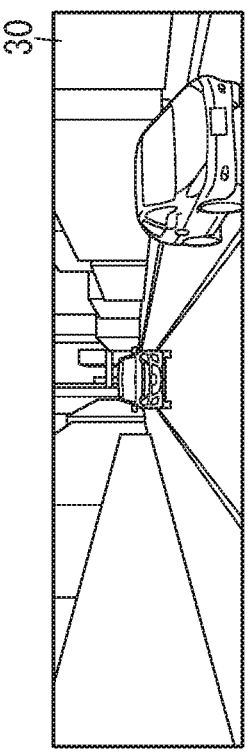
FIG. 5C depicts a virtual image viewed by the user with his or her eyes.

FIGS. 5A-5C depict exemplary images presented by the electronic mirror system 1 including the display system 2. As described above, the image distortions generated in the left-eye image 10L (see FIG. 5A) and right-eye image 10R (see FIG. 5B) formed on the user's 200 left and right eyes, respectively, are different from each other. Since different image distortions have been generated in the left-eye image 10L and right-eye image 10R formed on his or her left and right eyes, a parallax is produced by the image distortions between the left and right eyes, thus realizing a pseudo-stereoscopic view. That is to say, the user 200 is allowed to view a stereoscopic virtual image 30 (see FIG. 5C), and therefore, easily gain a sense of distance to any object (such as a following vehicle) captured in the virtual image 30. Note that the left-eye image 10L and the right-eye image 10R are each distorted into the shape of a parallelogram. Suppose the angle formed between a line drawn along one shorter side of the left-eye image 10L and a vertical line parallel to the upward/downward direction and the angle formed between a line drawn along one shorter side of the right-eye image 10R and the vertical line are each θ10 (see FIG. 5B). The optical system part 5 is configured such that the angle formed between a line drawn along one shorter side of the left-eye image 10L and a line drawn along one shorter side of the right-eye image 10R (i.e., 2×θ10) becomes equal to or greater than 1 degree and equal to or less than 4 degrees. If the angle (2×θ10) were less than 1 degree, the effect of producing a parallax between the left and right eyes would be insignificant. Thus, the angle (2×θ10) is suitably set at a predetermined value according to the height of the camera 3 over the ground, for example. On the other hand, if the angle (2×θ10) were greater than 4 degrees, then the parallax produced between the left and right eyes would be so significant that the user 200 would find the virtual image unnatural. For these reasons, the angle (2×θ10) suitably falls within the range of 1 degree to 4 degrees.

Furthermore, in the display system 2 according to this embodiment, the optical system part 5 includes the reflective member 51 for upwardly reflecting the incoming light beam, which is the light beam emerging from the display screen 411, to make the light beam incident on the left and right eyes of the user 200 as shown in FIG. 1. The reflective member 51 reflects the incoming light obliquely upward to make the light beam enter the eye box 210. This allows the virtual image 30 to appear to the users eyes as if the object captured in a lower portion of the virtual image 30 were located at a shorter distance than the object captured in an upper portion of the virtual image 30.

Figure 6A:
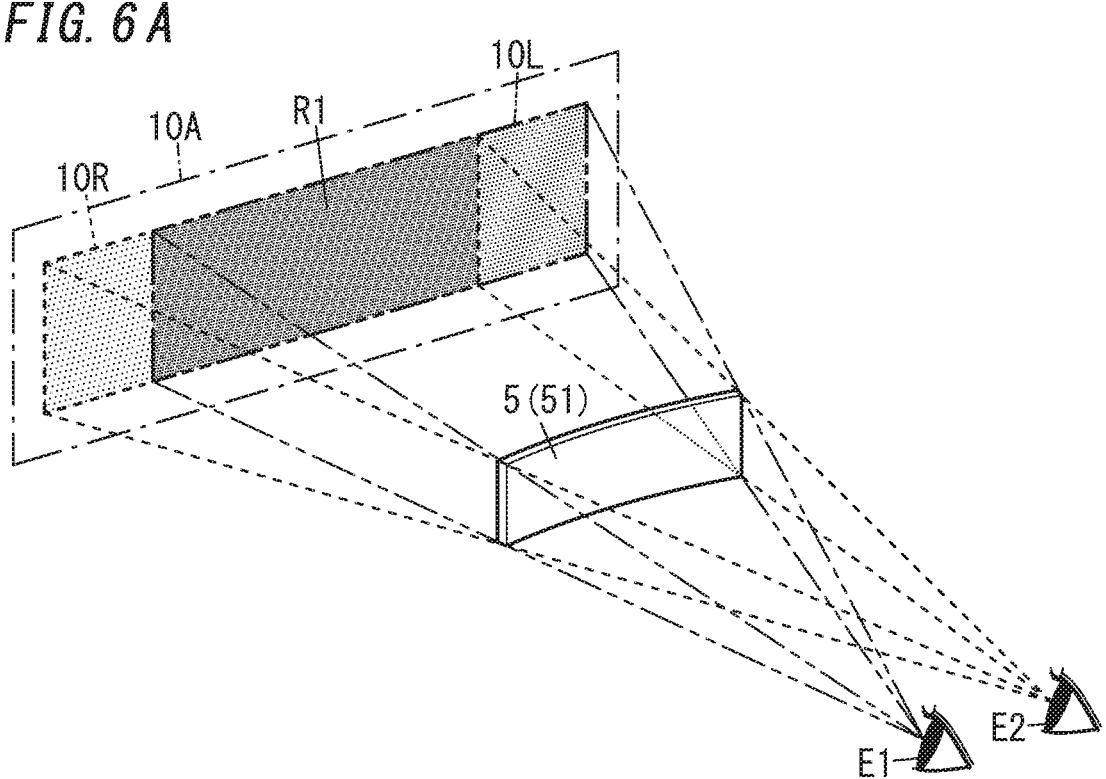
FIG. 6A illustrates a virtual image presented by the display system.
Figure 6B:
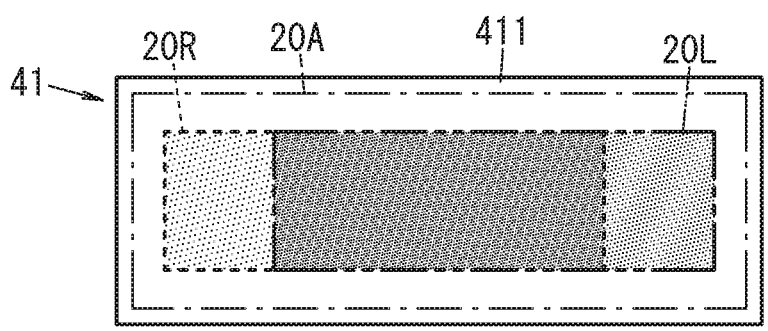
FIG. 6B illustrates an image produced on a display device included in the display system.

Furthermore, in the display system 2 according to this embodiment, the optical system part 5 (i.e., the reflective member 51 in this embodiment) forms, on the user's 200 left eye E1, a left-eye image 10L based on a first partial image 20L (see FIG. 6B), and also forms, on the user's 200 right eye E2, a right-eye image 10R based on a second partial image 20R (see FIG. 6B) as shown in FIGS. 6A and 6B. The first partial image 20L and the second partial image 20R each form part of the image 20A (see FIG. 6B) produced on the display screen 411 of the display 41 and partially overlap with each other. In FIG. 6A, the overall projected image 10A when the image 20A is totally reflected by the optical system part 5 is indicated by the one-dot chain rectangle. Note that in FIGS. 6A, 6B, 7A, and 7B, the lines (including dotted lines, one-dot chains, and two-dot chains) defining the image areas are just shown there for illustrative purposes and are insubstantial ones. Also, even though the left-eye image 10L and the right-eye image 10R are illustrated as frames in FIGS. 6A, 6B, 7A, and 7B, images based on the video shot by the camera 3 are actually presented there.

Figure 7A:
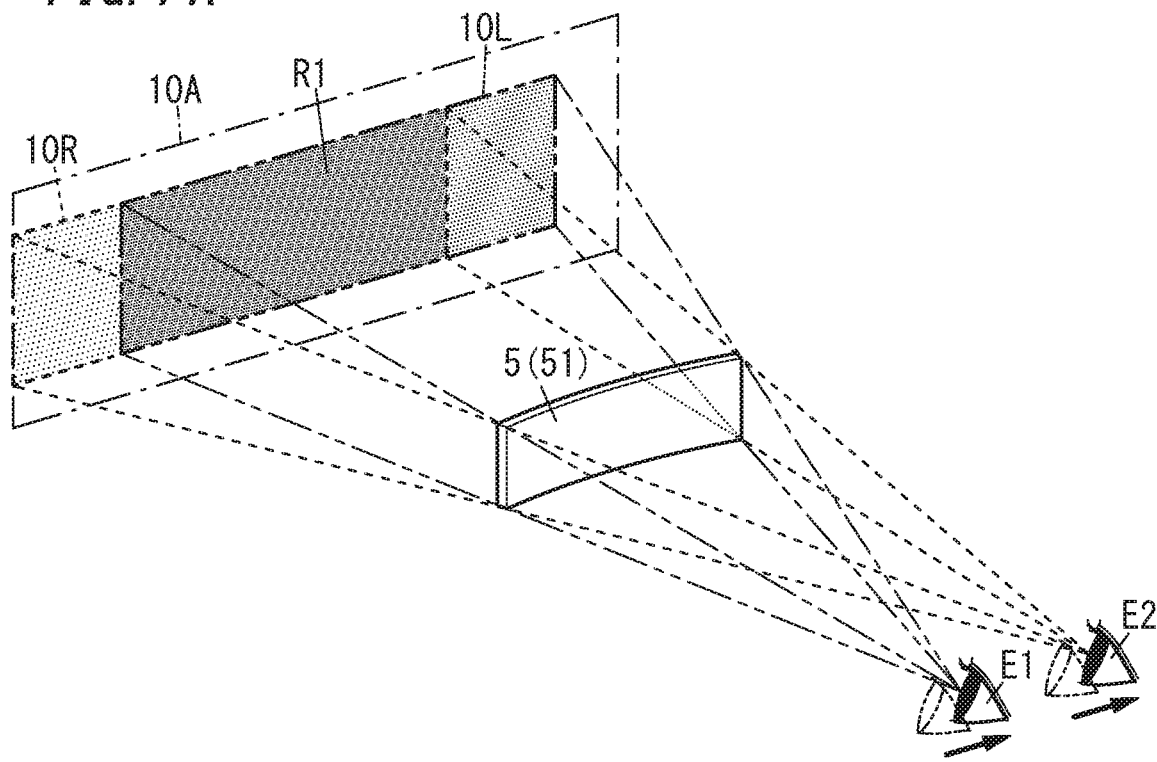
FIG. 7A illustrates a virtual image presented by the display system.
Figure 7B:
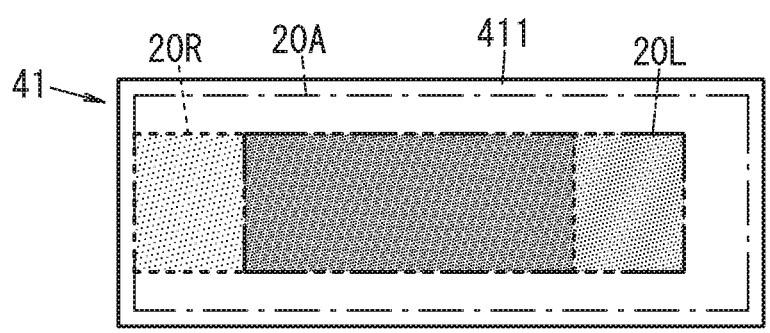
FIG. 7B illustrates an image produced on a display device included in the display system.

When the left eye E1 and right eye E2 of the user 200 are located at the center of the eye box 210, the left-eye image 10L and right-eye image 10R formed on his left and right eyes E1 and E2, respectively, are located at the center of the overall projected image 10A. That is why if the user's 200 head position has changed vertically and/or horizontally within the range of the eye box 210, the areas in the overall projected image 10A where the left-eye image 10L and the right-eye image 10R are formed shift with the change of the user's 200 head position (i.e., his or her eye locations). For example, if the user's 200 left eye E1 and right eye E2 have moved to the right from the locations shown in FIG. 6A within the range of the eye box 210 as shown in FIG. 7A, then the areas in the overall projected image 10A where the left-eye image 10L and the right-eye image 10R are formed shift to the left. In this manner, as the user's 200 head position (i.e., his or her eye locations) changes vertically and/or horizontally within the range of the eye box 210, the viewable range of the virtual image 30 shifts, thus realizing a mirror-like perspective for the user 200.

Furthermore, in the display system 2 according to this embodiment, the left-eye image 10L formed on the left eye via the optical system part 5 and the right-eye image 10R formed on the right eye via the optical system part 5 share some image area as shown in FIGS. 6A and 7A. The image distortion generation factor of the optical system part 5 is defined such that the image distortions of the left-eye image 10L and the right-eye image 10R are different from each other in at least an image area R1 (see FIGS. 6A and 7A) shared by the left-eye image 10L and the right-eye image 10R. Since the image distortions of the left-eye image 10L and the right-eye image 10R are different from each other in this manner in at least the image area R1 shared by the left-eye image 10L and the right-eye image 10R, a parallax is produced between the left and right eyes by the left-eye image 10L and right-eye image 10R in the image area R1. Producing a parallax between the left and right eyes realizes a pseudo-stereoscopic view. Thus, the display system 2 presents a virtual image 30 that allows the viewer to easily gain a sense of distance to the objects.

(3) Variations

The exemplary embodiment described above is only one of various embodiments of the present disclosure, and may be readily modified, changed, replaced, or combined with any other embodiments, depending on a design choice or any other factor, without departing from a true spirit and scope of the present disclosure.

Next, variations of the exemplary embodiment will be enumerated one after another. Optionally, any of the variations to be described below may be adopted in combination as appropriate.

The agent that implements the display system 2 or electronic mirror system 1 according to the present disclosure includes a computer system. The computer system includes, as principal hardware components, a processor and a memory. The functions of the agent that implements the display system 2 or electronic mirror system 1 according to the present disclosure are performed by making the processor execute the program stored in the memory of the computer system. The program may be stored in advance in the memory of the computer system. Alternatively, the program may also be downloaded through a telecommunications line or be distributed after having been stored in some computer-readable non-transitory storage medium. Examples of the computer-readable non-transitory storage media include a memory card, an optical disc, and a hard disk drive. The processor of the computer system is made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Furthermore, in the embodiment described above, the display system 2 is arranged in a front portion close to the windshield 104. However, this is only an example and should not be construed as limiting. Alternatively, the display system 2 may also be installed on the dashboard of the automobile 100.

Also, in the embodiment described above, the display system 2 is implemented as a single display device 8 with a single housing 70. However, this is only an example and should not be construed as limiting. Alternatively, some function of the display system 2 may also be implemented in at least one more housing, other than the housing 70. For example, the function of the display controller 42 of the image producing unit 4 may be distributed in two or more housings. That is to say, this display system 2 may be implemented as a cloud computing system as well.

In the exemplary embodiment described above, the electronic mirror system 1 including the display system 2 is applied to the automobile 100. However, this is only an example and should not be construed as limiting. The electronic mirror system 1 is also applicable to motorcycles, bicycles, railway trains, aircrafts, construction machines, ships, boats, and various types of moving vehicles other than automobiles 100.

(3.1) First Variation

Figure 8:
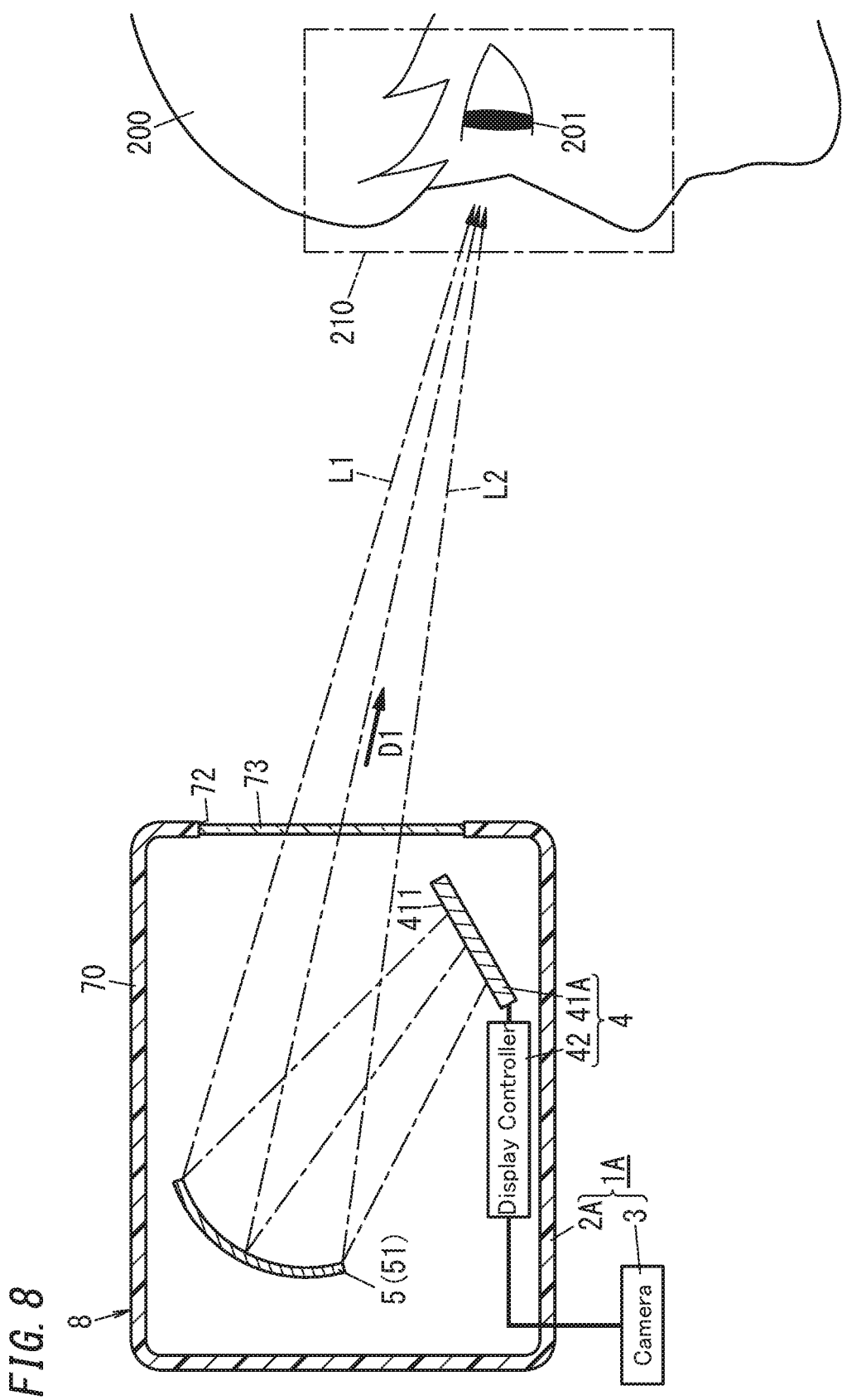
FIG. 8 illustrates a schematic configuration of a display system according to a first variation of the exemplary embodiment of the present disclosure.

In a display system 2A according to a first variation, the optical path length is set such that in the image presented to the user 200, the distance to the virtual image increases toward the top of the image as shown in FIG. 8, which is a major difference from the exemplary embodiment described above. In the following description, any constituent member of this variation having the same function as a counterpart of the exemplary embodiment described above will be designated by the same reference numeral as that counterpart's, and a detailed description thereof will be omitted herein.

In this display system 2A, the display 41A is arranged differently from the exemplary embodiment described above. Specifically, the display 41A is arranged inside the housing 70 with the display screen 411 tilted by a predetermined angle with respect to the vertical line such that the first optical path length L1 is greater than the second optical path length L2. As used herein, the first optical path length L1 is the length of an optical path leading from the image producing unit 4 (i.e., the display screen 411 of the display 41A) to the user's 200 eye box 210 with respect to respective upper edges of the left-eye image 10L and the right-eye image 10R. The second optical path length L2 is the length of an optical path leading from the image producing unit 4 (i.e., the display screen 411 of the display 41A) to the user's 200 eye box 210 with respect to respective lower edges of the left-eye image 10L and the right-eye image 10R. Arranging the display 41A and the optical system part 5 such that the first optical path length L1 is greater than the second optical path length L2 as described above allows the distance to the virtual image 30 to increase toward the top of the virtual image 30. Thus, the virtual image 30 appears to be even more distant to the users eyes.

This allows a greater parallax to be produced between the left and right eyes by tilting the display screen 411, besides simply producing the parallax between the left and right eyes by adjusting the image distortion generation factor (such as appropriately designing the free-form surface that is a reflective surface of the reflective member 51) of the optical system part 5 (such as the reflective member 51). This shifts the focus of his or her eyes, and therefore, enhances the effect of pseudo-stereoscopic viewing. Consequently, the display system 2A and electronic mirror system 1A according to this first variation also present a virtual image that allows the viewer to gain a sense of distance easily.

(3.2) Second Variation

Figure 9A:
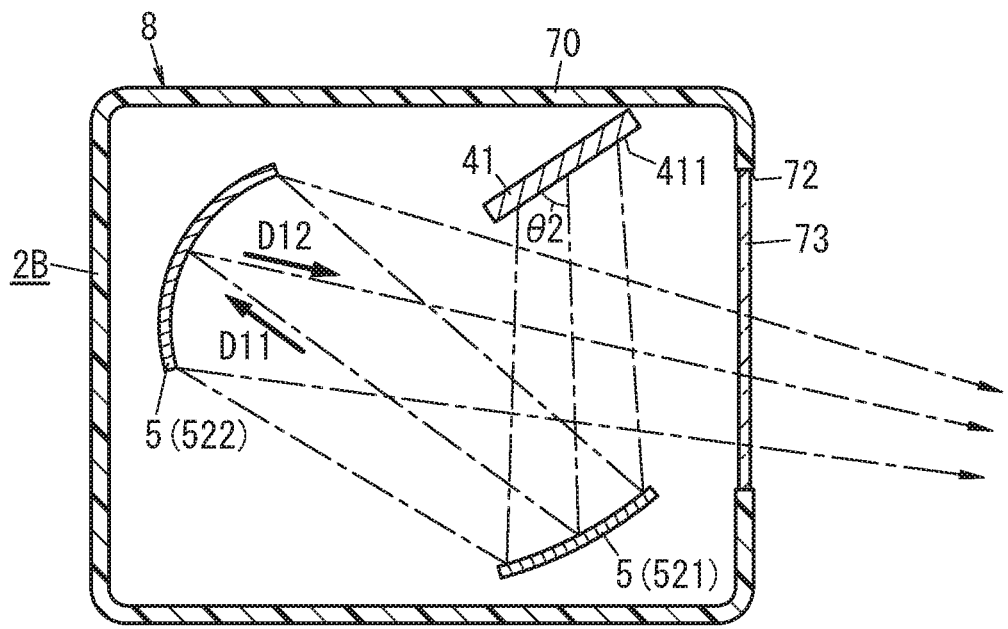
FIG. 9A illustrates a schematic configuration of a display system according to a second variation of the exemplary embodiment of the present disclosure.

In a display system 2B according to a second variation, the optical system part 5 is made up of a plurality of reflective members as shown in FIG. 9A, which is a major difference from the exemplary embodiment and first variation described above. In the following description, any constituent member of this variation having the same function as a counterpart of the exemplary embodiment or first variation described above will be designated by the same reference numeral as that counterpart's, and a detailed description thereof will be omitted herein.

In the display system 2B according to this second variation, the optical system part 5 includes two reflective members, namely, a first reflective mirror 521 and a second reflective mirror 522.

The first reflective mirror 521 and the second reflective mirror 522 may be implemented as concave mirrors, for example. The first reflective mirror 521 and the second reflective mirror 522 each have a reflective surface as a free-form surface. The respective reflective surfaces (free-form surfaces) of the first reflective mirror 521 and second reflective mirror 522 are configured to reflect the light beam that has come from the display 41 in any desired direction. That is to say, the image distortion generation factor is constituted by the properties (such as the shape of their reflective surface and the angle of reflection) of the first reflective mirror 521 and the second reflective mirror 522.

The second reflective mirror 522 is arranged in the housing 70 so as to face the light-transmitting plate 73.

The display 41 is arranged over the second reflective mirror 522 inside the housing 70 with its display screen 411 facing down.

The first reflective mirror 521 is arranged under the display 41 with its reflective surface facing the display 41 and the second reflective mirror 522.

In this display system 2B, the light beam emerging from the display screen 411 of the display 41 is reflected twice by the first reflective mirror 521 and the second reflective mirror 522, respectively, and then goes out of the display device 8 through the light-transmitting plate 73 toward the eye box 210. Thus, a virtual image 30, based on the image produced on the display screen 411 of the display 41, is projected toward the user's 200 eyes. This allows the user 200 to view the virtual image 30 projected by the display system 2B.

In this display system 2B, the light beam emerging from the display screen 411 of the display 41 is reflected a number of times by the optical system part 5 and then allowed to go out of the housing 70 toward the eye box 210. The second reflective mirror 522 that reflects the light beam for the last time reflects the incoming light beam upward to let the light beam go toward the eye box 210. That is to say, the optical system part 5 includes a reflective member (i.e., the second reflective mirror 522) that upwardly reflects the incoming light beam that has emerged from the display screen 411 and makes the reflected light beam incident on the user's 200 left and right eyes. In this variation, the reflective member (second reflective mirror 522) receives a light beam coming from the reflective member (first reflective mirror 521) located obliquely below the former reflective member (i.e., in the direction indicated by the arrow D11), and reflects the incoming light beam obliquely upward (i.e., in the direction indicated by the arrow D12). In this manner, the second reflective mirror 522 that reflects the incoming light beam for the last time reflects the light beam upward and then lets the light beam go toward the user's 200 eye box 210. Thus, the virtual image 30 formed on the user's 200 eyes appears as if the distance to the virtual image 30 were shorter in a lower portion thereof than in an upper portion thereof.

Figure 9B:
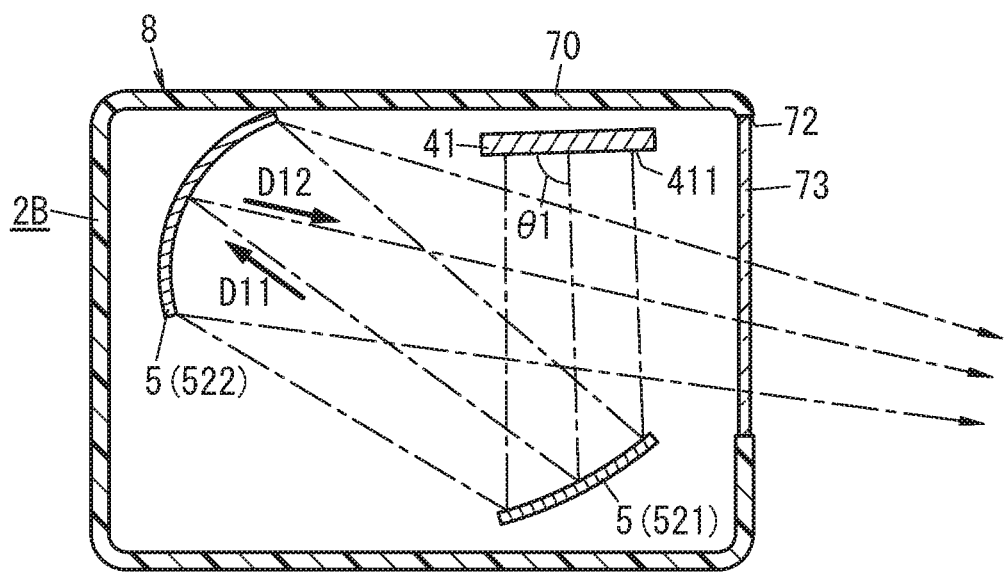
FIG. 9B illustrates a schematic configuration of the display system according to the second variation of the exemplary embodiment of the present disclosure.

Optionally, in the display system 2B according to this second variation, the display 41 may be arranged such that the angle θ1 formed between the direction in which the light beam travels from the display screen 411 toward the first reflective mirror 521 and the display screen 411 (see FIG. 9B) is larger than the angle θ2 shown in FIG. 9A. Specifically, in the display system 2B shown in FIG. 9B, the display 41 is arranged such that the angle θ1 formed between the direction in which the light beam travels from the display screen 411 toward the first reflective mirror 521 and the display screen 411 (see FIG. 9B) becomes a right angle. As used herein, the "right angle" does not have to be exactly equal to 90 degrees but may fall within an angular range that allows the vertical dimension of the housing 70 to be reduced. For example, the "right angle" may refer to a situation where the angle θ1 formed between the direction in which the light beam travels from the display screen 411 toward the first reflective mirror 521 and the display screen 411 falls within the range of 70 degrees to 110 degrees.

Arranging the display 41 such that the angle θ1 formed between the direction in which the light beam travels from the display screen 411 toward the first reflective mirror 521 and the display screen 411 becomes a right angle makes the angle formed between the display screen 411 of the display 41 and the horizontal plane smaller than in the arrangement shown in FIG. 9A. Thus, the arrangement shown in FIG. 9B allows the vertical dimension of the housing 70 to be reduced compared to the arrangement shown in FIG. 9A, thus downsizing the display device 8.

In this second variation, the optical system part 5 includes two reflective members (namely, the first reflective mirror 521 and the second reflective mirror 522). However, this is only an example and should not be construed as limiting. Alternatively, the optical system part 5 may include three or more reflective members as well. Optionally, the optical system part 5 may include a lens that refracts the incoming light or may include a reflective member and a lens in combination. In short, the configuration of the optical system part 5 may be changed as appropriate according to the design of the optical paths.

(3.3) Third Variation

Figure 10:
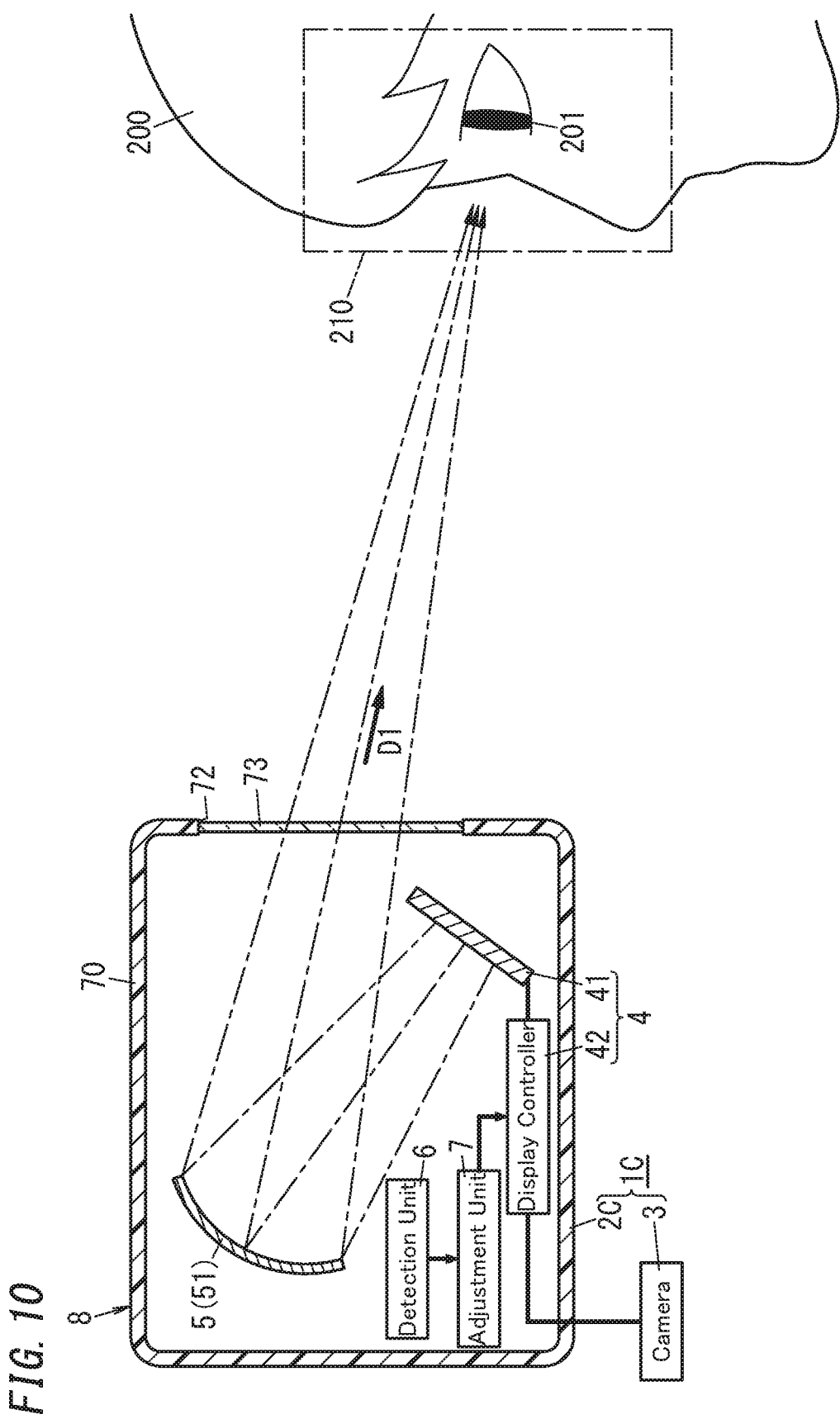
FIG. 10 illustrates a schematic configuration of a display system according to a third variation of the exemplary embodiment of the present disclosure.

A display system 2C and electronic mirror system 1C according to a third variation further includes a detection unit 6 and an adjustment unit 7 as shown in FIG. 10, which is a major difference from the exemplary embodiment and the first and second variations described above. In the following description, any constituent member of this variation having the same function as a counterpart of the exemplary embodiment and first and second variations described above will be designated by the same reference numeral as that counterpart's, and a detailed description thereof will be omitted herein.

The detection unit 6 detects the user's 200 eye locations. For example, the detection unit 6 may detect the user's 200 eye locations by the user's 200 face image captured by an image capture device such as a CMOS image sensor. Note that the detection unit 6 does not have to detect the users 200 eye locations directly but may detect the user's 200 face location first, and then determine his or her likely eye locations based on the location of his or her face.

The adjustment unit 7 adjusts, in accordance with the result of detection by the detection unit 6, the respective image distortions of the left-eye image 10L and the right-eye image 10R. In this variation, the adjustment unit 7 adjusts the respective image distortions of the left-eye image 10L and the right-eye image 10R by making, based on the result of detection by the detection unit 6, adjustments to the image produced on the display screen 411 of the display 41.

Figure 11:
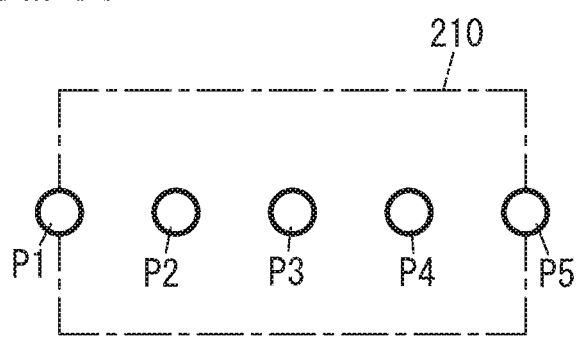
FIG. 11 illustrates a relationship between an eye box and locations of viewpoints in the display system according to the third variation.

FIG. 11 illustrates the user's 200 viewpoint locations in the eye box 210. When the center of the user's 200 face is located at the center (Point P3) of the eye box 210, his or her left eye is assumed to be located at Point P4 and his or her right eye is assumed to be located at Point P2. When the center of the user's 200 face is located at Point P2, his or her left eye is assumed to be located at Point P3 and his or her right eye is assumed to be located at Point P1. When the center of the users 200 face is located at Point P4, his or her left eye is assumed to be located at Point P5 and his or her right eye is assumed to be located at Point P3.

FIG. 12 illustrates the left-eye images 10L and right-eye images 10R in a situation where the image 20A produced on the display 41 remains the same irrespective of the user's 200 viewpoint location.

In this case, the image producing unit 4 produces the same image 20A on the display screen 411, irrespective of the location of the center of the user's 200 face (i.e., the locations of the user's 200 eyes). Therefore, the left-eye image 10L formed on the left eye and the right-eye image 10R formed on the right eye vary depending on where the center of his or her face is located (i.e., at Point P2, Point P3, or Point P4). In this manner, the images formed on the left and right eyes vary according to the user's 200 eye locations (viewpoint locations), and therefore, the virtual image may look different to his or her eyes.

In contrast, according to this third variation, the adjustment unit 7 changes the image 20A produced on the display screen 411 depending on the result of detection by the detection unit 6, i.e., according to the user's 200 eye locations. The adjustment unit 7 changes the image 20A produced on the display screen 411 such that the left-eye image 10L and right-eye image 10R formed on the user's 200 left and right eyes, respectively, do not change as shown in FIG. 13 even when his or her eye locations have changed. Specifically, the adjustment unit 7 changes the image 20A produced on the display screen 411 according to the user's 200 eye locations such that the left-eye image 10L and right-eye image 10R respectively agree with the left-eye image 10L and right-eye image 10R when the center of the user's 200 face is located at Point P3. This reduces the change of the left-eye image 10L and right-eye image 10R even when the user's 200 eye locations have changed, thus reducing a variation in the image distortions of the left-eye image 10L and right-eye image 10R. Consequently, this achieves the advantage of reducing a variation in the virtual image presented to the user's 200 eyes, even when the user's 200 eye locations have changed.

(Resume)

As can be seen from the foregoing description, a display system (2, 2A-2C) according to a first aspect includes an image producing unit (4) and an optical system part (5). The image producing unit (4) produces an image on a display screen (411) by letting a light beam, which eventually forms a virtual image based on the image produced, emerge from the display screen (411). The optical system part (5) forms a left-eye image (10L) and a right-eye image (10R) on a user's (200) left and right eyes, respectively, and thereby projects the virtual image (30) toward a user's (200) left and right eyes by reflecting and/or refracting the light beam emerging from the display screen (411). The optical system part (5) has an image distortion generation factor (51) to make an image distortion of the left-eye image (10L) different from an image distortion of the right-eye image (10R).

This aspect realizes a pseudo-stereoscopic view by producing a parallax between the user's (200) right and left eyes, thus providing a display system (2, 2A-2C) with the ability to present a virtual image (30) that allows the viewer to gain a sense of distance easily.

In a display system (2, 2A-2C) according to a second aspect, which may be implemented in conjunction with the first aspect, the left-eye image (10L) and the right-eye image (10R) are distorted vertically asymmetrically to each other.

This aspect allows a varying parallax to be produced between the right and left eyes according to the distance from the user's (200) eye box (210) to the virtual image (30).

In a display system (2, 2A-2C) according to a third aspect, which may be implemented in conjunction with the first or second aspect, a magnitude of horizontal shift between the left-eye image (10L) and the right-eye image (10R) varies vertically in the left-eye image (10L) and the right-eye image (10R).

This aspect allows a varying parallax to be produced on the right and left eyes according to the distance from the user's (200) eye box (210) to the virtual image (30) vertically on the left- and right-eye images (10L, 10R).

In a display system (2, 2A-2C) according to a fourth aspect, which may be implemented in conjunction with any one of the first to third aspects, a second magnitude of shift (G2) is greater than a first magnitude of shift (G1). The first magnitude of shift (G1) is the magnitude of shift between the left-eye image (10L) and the right-eye image (10R) at respective upper edges thereof. The second magnitude of shift (G2) is the magnitude of shift between the left-eye image (10L) and the right-eye image (10R) at respective lower edges thereof.

This aspect enhances the effect of stereoscopic viewing by increasing the parallax in a region close to the user's (200) viewpoint.

In a display system (2, 2A-2C) according to a fifth aspect, which may be implemented in conjunction with any one of the first to fourth aspects, a first optical path length (L1) is greater than a second optical path length (L2). The first optical path length (L1) is the length of an optical path leading from the image producing unit (4) to the user's (200) eye box (210) with respect to respective upper edges of the left-eye image (10L) and the right-eye image (10R). The second optical path length (L2) is the length of an optical path leading from the image producing unit (4) to the user's (200) eye box (210) with respect to respective lower edges of the left-eye image (10L) and the right-eye image (10R).

This aspect provides a display system (2, 2A-2C) with the ability to present a virtual image (30) that allow the user to gain a sense of distance even more easily.

In a display system (2, 2A-2C) according to a sixth aspect, which may be implemented in conjunction with any one of the first to fifth aspects, the optical system part (5) is configured to form, on the left eye, the left-eye image (10L) based on a first partial image (20L) and also form, on the right eye, the right-eye image (10R) based on a second partial image (20R). The first partial image (20L) forms one part of the image (20A) produced on the display screen (411). The second partial image (20R) forms another part of the image (20A) produced on the display screen (411).

This aspect allows the user (200) to view the virtual image (30) in a different perspective according to a change in his or her eye locations.

In a display system (2, 2A-2C) according to a seventh aspect, which may be implemented in conjunction with the sixth aspect, the left-eye image (10L) and the right-eye image (10R) share some image area. The image distortions of the left-eye image (10L) and the right-eye image (10R) are different from each other in at least the image area (R1) shared by the left-eye image (10L) and the right-eye image (10R).

This aspect allows a parallax to be produced between the right and left eyes by making the respective image distortions of the left-eye image (10L) and the right-eye image (10R) different from each other at least in the image area (R1), thus realizing a pseudo-stereoscopic view. This provides a display system (2, 2A-2C) with the ability to present a virtual image (30) that allows the user to gain a sense of distance easily.

A display system (2, 2A-2C) according to an eighth aspect, which may be implemented in conjunction with any one of the first to seventh aspects, further includes a detection unit (6) and an adjustment unit (7). The detection unit (6) detects locations of the user's (200) eyes. The adjustment unit (7) adjusts, based on a result of detection by the detection unit (6), at least one of the image distortion of the left-eye image (10L) or the image distortion of the right-eye image (10R).

This aspect allows the image distortions of the left-eye image (10L) and the right-eye image (10R) to be adjusted according to the locations of the user's (200) eyes. This allows the image distortions of the left-eye image (10L) and the right-eye image (10R) to be adjusted such that the virtual image (30) appears to be unchanged even when the user's (200) eye locations have changed.

In a display system (2, 2A-2C) according to a ninth aspect, which may be implemented in conjunction with any one of the first to eighth aspects, the optical system part (5) includes a reflective member (51, 522) configured to upwardly reflect an incoming light beam that has emerged from the display screen (411) and incident on the reflective member (51, 522) and make the incoming light beam reflected enter the left eye and the right eye.

This aspect provides a display system (2, 2A-2C) with the ability to present a virtual image (30) that allows the viewer to gain a sense of distance easily.

In a display system (2, 2A-2C) according to a tenth aspect, which may be implemented in conjunction with any one of the first to ninth aspects, the image producing unit (4) is configured to produce the image, based on video shot by a camera (3), on the display screen (411).

This aspect allows a virtual image (30) to be presented based on the video shot by a camera (3).

In a display system (2, 2A-2C) according to an eleventh aspect, which may be implemented in conjunction with any one of the first to tenth aspects, the optical system part (5) includes a reflective member (51), and the image distortion generation factor (51) includes a reflective surface property that affects the image distortions.

This aspect provides a display system (2, 2A-2C) with the ability to present a virtual image (30) that allows the viewer to gain a sense of distance easily.

In a display system (2, 2A-2C) according to a twelfth aspect, which may be implemented in conjunction with the eleventh aspect, the reflective surface of the reflective member (51) includes a free-form surface.

This aspect provides a display system (2, 2A-2C) with the ability to present a virtual image (30) that allows the viewer to gain a sense of distance easily.

An electronic mirror system (1, 1A-1C) according to a thirteenth aspect includes the display system (2, 2A-2C) according to any one of the first to ninth aspects and a camera (3). The image producing unit (4) is configured to produce the image, based on video shot by the camera (3), on the display screen (411).

This aspect provides an electronic mirror system (1, 1A-1C) with the ability to present a virtual image (30) that allows the viewer to gain a sense of distance easily.

A moving vehicle (100) according to a fourteenth aspect includes the electronic mirror system (1, 1A-1C) according to the eleventh aspect and a moving vehicle body (101) to mount the electronic mirror system (1, 1A-1C) thereon.

This aspect provides a moving vehicle (100) including an electronic mirror system (1, 1A-1C) with the ability to present a virtual image (30) that allows the viewer to gain a sense of distance easily.

In a moving vehicle (100) according to a fifteenth aspect, which may be implemented in conjunction with the fourteenth aspect, the camera (3) shoots video presenting a rear view of the moving vehicle body (101).

This aspect provides a moving vehicle (100) including an electronic mirror system (1, 1A-1C) with the ability to present a virtual image (30) that allows the viewer to gain a sense of distance easily.

A display method according to a sixteenth aspect includes: producing an image on a display screen (411) of an image producing unit (4) by letting a light beam, which eventually forms a virtual image based on the image produced, emerge from the display screen (411); reflecting and/or refracting the light beam by an optical system part (5) to form a left-eye image (10L) and a right-eye image (10R) on the user's (200) left and right eyes, respectively, and thereby project the virtual image (30) toward the user's (200) left and right eyes; and generating, by an image distortion generation factor (51) of the optical system part (5), mutually different image distortions on the left-eye image (10L) and the right-eye image (10R).

This aspect presents a virtual image (30) that allows the user to gain a sense of distance easily.

Note that the constituent elements according to the second to twelfth aspects are not essential elements of the display system (2, 2A-2C) but may be omitted as appropriate and that the constituent elements according to the fifteenth aspect are not essential elements of the moving vehicle (100) but may be omitted as appropriate.

While various embodiments have been described herein above, it is to be appreciated that various changes in form and detail may be made without departing from the spirit and scope of the present disclosure presently or hereafter claimed.

In this application, the entire contents of Japanese Patent Application No. 2018-60692 mentioned above are hereby incorporated by reference for all purposes.

The invention claimed is:

1. A display system comprising:
an image producing unit configured to produce an image on a display screen by letting a light beam, which eventually forms a virtual image based on the image produced, emerge from the display screen; and
an optical system part configured to form a left-eye image and a right-eye image on user's left and right eyes, respectively, and thereby project the virtual image toward the user's left and right eyes by reflecting and/or refracting the light beam emerging from the display screen,
the optical system part having an image distortion generation factor that generates an image distortion of the left-eye image different from an image distortion of the right-eye image,
wherein the image distortion generation factor distorts the left-eye image and the right-eye image into a parallelogram shape, such that the image distortion of the left-eye image and the image distortion of the right-eye image are opposite in a left-right direction, such that a parallax image formed between the left eye and the right eye of the user is smaller at an upper edge of the parallax image than at the lower edge of the parallax image.

2. The display system of claim 1, wherein
the left-eye image and the right-eye image are distorted vertically asymmetrically to each other.

3. The display system of claim 1, wherein
a magnitude of horizontal shift between the left-eye image and the right-eye image varies vertically in the left-eye image and the right-eye image.

4. The display system of claim 2, wherein
a magnitude of horizontal shift between the left-eye image and the right-eye image varies vertically in the left-eye image and the right-eye image.

5. The display system of claim 1, wherein
a second magnitude of shift between the left-eye image and the right-eye image at respective lower edges thereof is greater than a first magnitude of shift between the left-eye image and the right-eye image at respective upper edges thereof.

6. The display system of claim 2, wherein
a second magnitude of shift between the left-eye image and the right-eye image at respective lower edges thereof is greater than a first magnitude of shift between the left-eye image and the right-eye image at respective upper edges thereof.

7. The display system of claim 1, wherein
a first optical path leading from the image producing unit to a user's eye box with respect to respective upper edges of the left-eye image and the right-eye image is longer than a second optical path leading from the image producing unit to the user's eye box with respect to respective lower edges of the left-eye image and the right-eye image.

8. The display system of claim 2, wherein
a first optical path leading from the image producing unit to a user's eye box with respect to respective upper edges of the left-eye image and the right-eye image is longer than a second optical path leading from the image producing unit to the user's eye box with respect to respective lower edges of the left-eye image and the right-eye image.

9. The display system of claim 3, wherein
a first optical path leading from the image producing unit to a user's eye box with respect to respective upper edges of the left-eye image and the right-eye image is longer than a second optical path leading from the image producing unit to the user's eye box with respect to respective lower edges of the left-eye image and the right-eye image.

10. The display system of claim 1, wherein
the optical system part is configured to form, on the left eye, the left-eye image based on a first partial image that forms one part of the image produced on the display screen and also form, on the right eye, the right-eye image based on a second partial image that forms another part of the image produced on the display screen.

11. The display system of claim 10, wherein
the left-eye image and the right-eye image share some image area, and
the image distortions of the left-eye image and the right-eye image are different from each other in at least the image area shared by the left-eye image and the right-eye image.

12. The display system of claim 1, further comprising:
a detection unit configured to detect locations of the user's eyes; and
an adjustment unit configured to adjust, based on a result of detection by the detection unit, at least one of the image distortion of the left-eye image or the image distortion of the right-eye image.

13. The display system of claim 1, wherein
the optical system part includes a reflective member configured to upwardly reflect an incoming light beam that has emerged from the display screen and incident on the reflective member and to make the incoming light beam reflected enter the left eye and the right eye.

14. The display system of claim 1, wherein
the image producing unit is configured to produce the image, based on video shot by a camera, on the display screen.

15. The display system of claim 1, wherein
the optical system part includes a reflective member, and
the image distortion generation factor includes a reflective surface property that affects the image distortions.

16. The display system of claim 15, wherein
the reflective surface of the reflective member includes a free-form surface.

17. An electronic mirror system comprising:
the display system of claim 1; and
a camera,
the image producing unit being configured to produce the image, based on video shot by the camera, on the display screen.

18. A moving vehicle comprising:
the electronic mirror system of claim 17; and
a moving vehicle body configured to mount the electronic mirror system thereon.

19. The moving vehicle of claim 18, wherein
the camera is configured to shoot video presenting a rear view of the moving vehicle body.

20. A display method comprising:
producing an image on a display screen of an image producing unit by letting a light beam, which eventually forms a virtual image based on the image produced, emerge from the display screen;
reflecting and/or refracting the light beam by an optical system part to form a left-eye image and a right-eye image on user's left and right eyes, respectively, and thereby project the virtual image toward the user's left and right eyes; and
generating, by an image distortion generation factor of the optical system part, mutually different image distortions on the left-eye image and the right-eye image,
wherein the image distortion generation factor distorts the left-eye image and the right-eye image into a parallelogram shape, such that the image distortion of the left-eye image and the image distortion of the right-eye image are opposite in a left-right direction, such that a parallax image formed between the left eye and the right eye of the user is smaller at an upper edge of the parallax image than at the lower edge of the parallax image.

* * * * *